(12) United States Patent
Emo

(10) Patent No.: US 8,947,814 B2
(45) Date of Patent: Feb. 3, 2015

(54) COLLECTION OF READBACK SIGNAL MODULATION DATA

(71) Applicant: Seagate Technology LLC, Cupertino, CA (US)

(72) Inventor: Bruce Douglas Emo, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/861,976

(22) Filed: Apr. 12, 2013

(65) Prior Publication Data

US 2013/0222937 A1     Aug. 29, 2013

Related U.S. Application Data

(63) Continuation of application No. 12/339,256, filed on Dec. 19, 2008, now abandoned.

(51) Int. Cl.
*G11B 5/02* (2006.01)
*G11B 21/02* (2006.01)
*G11B 5/60* (2006.01)
*G11B 5/596* (2006.01)
*G11B 5/40* (2006.01)
*G11B 5/455* (2006.01)
*G11B 19/04* (2006.01)

(52) U.S. Cl.
CPC ............. *G11B 21/02* (2013.01); *G11B 5/6076* (2013.01); *G11B 5/59622* (2013.01); *G11B 5/40* (2013.01); *G11B 5/455* (2013.01); *G11B 5/6005* (2013.01); *G11B 5/6029* (2013.01); *G11B 19/048* (2013.01)

USPC ............................................. 360/55; 360/75

(58) Field of Classification Search
CPC ............... G11B 5/6011; G11B 5/6076; G11B 5/59605; G11B 5/59622; G11B 20/10037
USPC .......... 369/44.29, 44.35, 44.36, 47.25, 124.1; 360/39, 55, 46, 75
See application file for complete search history.

(56) References Cited

U.S. PATENT DOCUMENTS

| | | | |
|---|---|---|---|
| 5,691,857 A * | 11/1997 | Fitzpatrick et al. | 360/77.06 |
| 7,038,875 B2 | 5/2006 | Lou et al. | |
| 7,292,401 B2 | 11/2007 | Shen et al. | |
| 7,310,194 B1 * | 12/2007 | Schardt et al. | 360/75 |
| 7,518,813 B1 * | 4/2009 | Egan et al. | 360/25 |
| 7,768,732 B2 * | 8/2010 | Ozdemir | 360/65 |
| 7,916,420 B1 * | 3/2011 | McFadyen et al. | 360/75 |
| 2003/0002199 A1 * | 1/2003 | Au et al. | 360/77.04 |
| 2004/0165303 A1 | 8/2004 | Wu et al. | |
| 2006/0069945 A1 * | 3/2006 | Takashi et al. | 714/5 |
| 2006/0139789 A1 * | 6/2006 | Yang | 360/75 |
| 2009/0147390 A1 * | 6/2009 | Tang et al. | 360/31 |
| 2010/0033860 A1 * | 2/2010 | Tomita | 360/31 |
| 2010/0080101 A1 * | 4/2010 | Rochat et al. | 369/53.41 |
| 2010/0142082 A1 * | 6/2010 | Sakagami et al. | 360/75 |
| 2011/0249361 A1 * | 10/2011 | Mathew et al. | 360/75 |

* cited by examiner

*Primary Examiner* — Thomas Alunkal
(74) *Attorney, Agent, or Firm* — Westman, Champlin & Koehler, P.A.

(57) ABSTRACT

A data storage system having a read channel configured to function in a normal operation mode and a test mode. In the normal operation mode, the read channel is configured to decode a readback signal to obtain data bits. In the test mode, the read channel is configured to extract gain control loop data and/or timing control loop data from the readback signal.

19 Claims, 4 Drawing Sheets

COLLECTION OF READBACK SIGNAL MODULATION DATA

CROSS-REFERENCE TO RELATED APPLICATION

The present application is a continuation of and claims priority from U.S. patent application Ser. No. 12/339,256, filed on Dec. 19, 2008, and entitled "Collection of Readback Signal Modulation Data," the content of which is hereby incorporated by reference in its entirety.

BACKGROUND

The present embodiments relate generally to data storage systems and more particularly, but not by way of limitation, to the collection of readback signal modulation data in a data storage system.

Mass storage devices are one of many components of modern computers. One type of mass storage device is a disc drive. In general, disc drives read and write information along concentric tracks formed on discs. A magnetic disc drive, which is a particular type of disc drive, includes one or more magnetic discs mounted for rotation on a hub or spindle. A typical magnetic disc drive also includes heads that communicate with the magnetic discs. Each head is carried by a slider which is designed to "fly" just over the surface of the rotating disc. An actuator moves the slider radially over the disc surface for track seek operations and holds the head directly over a track on the disc surface for track following operations.

Information is typically stored in concentric tracks on the surface of a magnetic disc by providing a write signal to the head to encode flux reversals on the surface of the magnetic disc representing the data to be stored. In retrieving data from the disc, the drive controller controls the actuator so that the head flies above the magnetic disc, sensing the flux reversals on the magnetic disc, and generating a readback signal based on those flux reversals. The readback signal is typically conditioned and then decoded by a drive read channel to recover data represented by flux reversals stored on the magnetic disc.

To locate a particular track on a disc, disc drives typically use embedded servo fields on the disc. Thus, a typical disc format comprises "pie-shaped" wedges of servo information interweaved between sections of data. The embedded servo fields are utilized by a servo sub-system to position a head over a particular track.

As the density of data recorded on magnetic discs continues to increase, it is becoming necessary for the spacing between the head carried by the slider and the disc to decrease to very small distances. Spacings of well below 10 nanometers (nm) are required in some applications. In disc drive systems having such small slider-disc spacing, the possibility of contact between the slider and the disc is relatively high, due to factors such as slider manufacturing process limitations and limited air-bearing modeling capabilities. A promising method to detect such contacts is to examine modulation in a readback signal produced by the head during a read operation, for example. However, current disc drives are not configured for collection of readback signal modulation data that is suitable for use in providing relatively accurate slider-disc contact detection, for example.

The present embodiments address these problems and offers other advantages over the prior art.

SUMMARY

An aspect of the disclosure relates to collecting modulation data, such as gain control loop data and timing control loop data, from a readback signal in a data storage device.

In one method embodiment, a test mode and a normal operation mode are established in a read channel of a data storage device. Gain control loop data and/or timing control loop data are collected from a readback signal during operation of the read channel in the test mode.

In an apparatus embodiment, a data storage system having a read channel configured to function in a normal operation mode and a test mode is provided. In the normal operation mode, the read channel is configured to decode a readback signal to obtain data bits. In the test mode, the read channel is configured to extract gain control loop data and/or timing control loop data from the readback signal.

In another method embodiment, gain control loop data and/or timing control loop data are extracted from a readback signal obtained while reading user data stored on a data storage medium. The extracted gain control loop data and/or timing control loop data from the readback signal obtained while reading user data stored on a data storage medium is transferred via a data transfer bus. The extracted gain control loop data and/or timing control loop data is obtained via the data transfer bus and stored.

These and various other features and advantages will become apparent upon reading the following detailed description and upon reviewing the associated drawings.

DETAILED DESCRIPTION

Figure 1A:
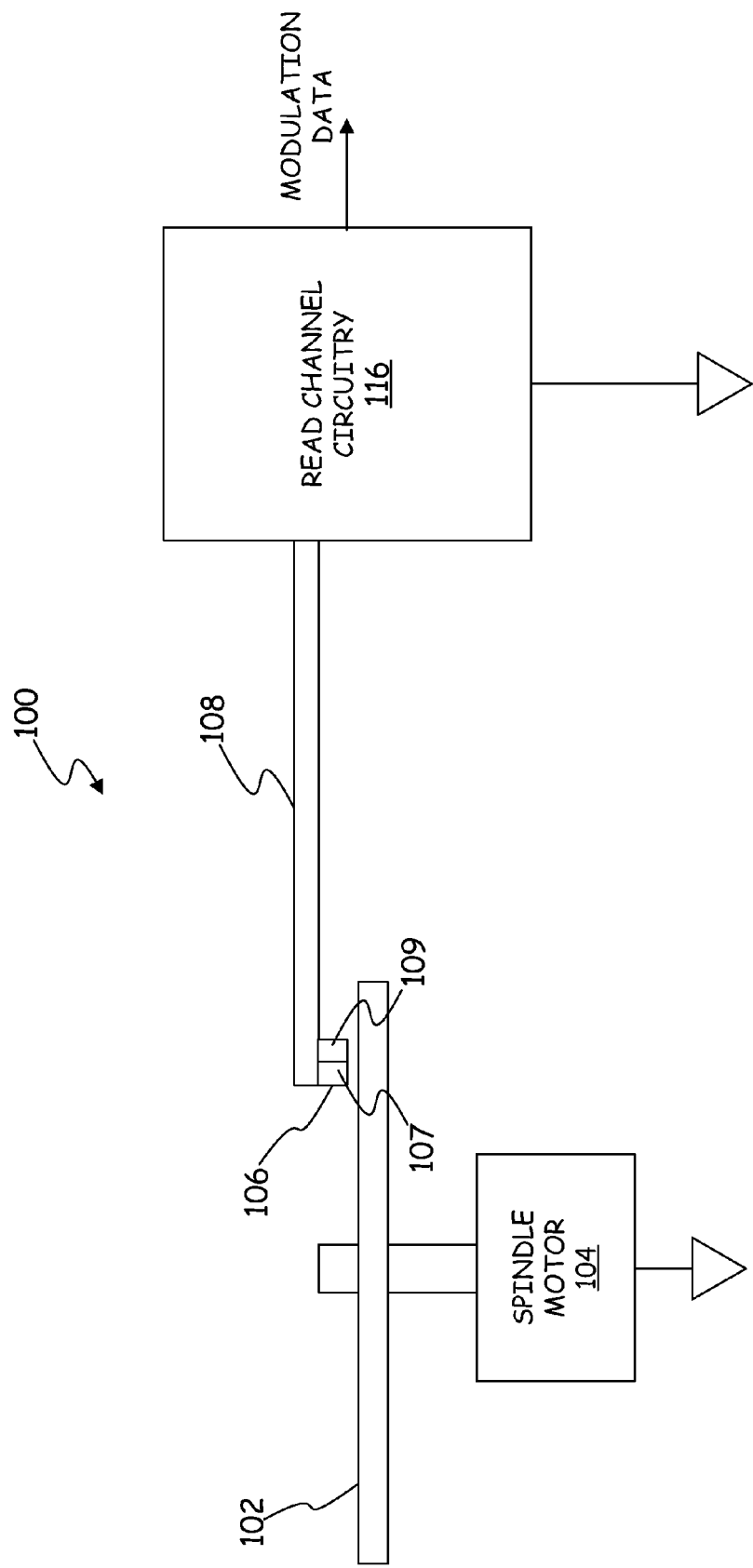
FIG. 1A is a simplified block diagram of a data storage system in accordance with one embodiment.

FIG. 1A is a simplified block diagram of a data storage system 100 in accordance with one exemplary embodiment. Data storage system 100 includes a data storage medium 102, which is rotated with the help of spindle motor 104. A head 106 communicates with the data storage medium 102. Head 106 is operably coupled to an actuator 108. Data storage system 100 reads and writes information along concentric tracks formed on data storage medium 102 with the help of head 106, which includes a readback sensor 107 and a write transducer 109. During a read operation, an analog readback signal produced by the readback sensor 107 is processed by read channel circuitry 116, which is configured to function in a normal operation mode and a test mode. These operation modes are described further below.

Figure 1B:
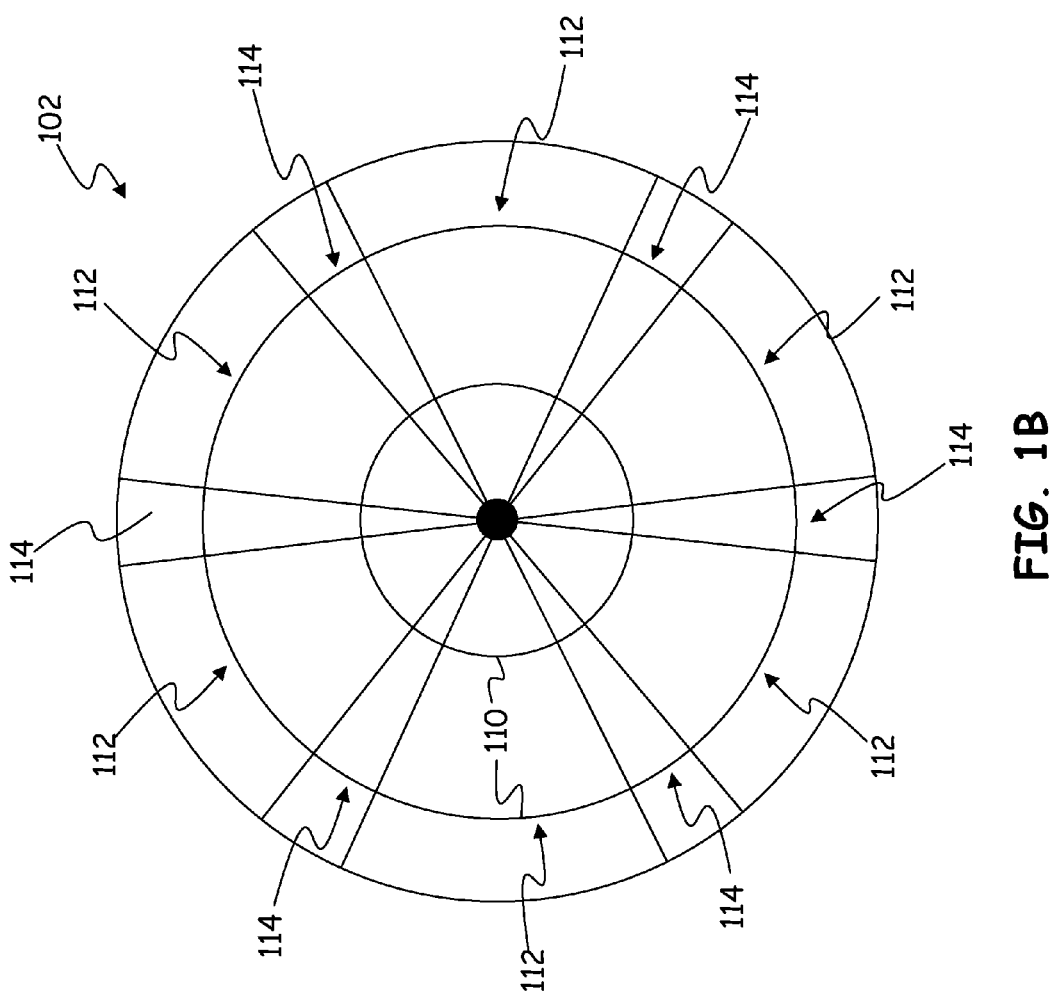
FIG. 1B is a diagrammatic illustration of a surface of a data storage medium.

To locate a particular track on data storage medium 102, data storage system 100 uses embedded servo fields on the disc. FIG. 1B shows a surface of data storage medium 102, which is in the form of a disc that includes concentric tracks 110 with data fields 112 and servo fields 114, for example. In FIG. 1B, only two tracks are shown in the interest of simplification. However, a typical disc surface includes a very large number of closely spaced tracks. Also, although the servo field and data field boundaries are, in the interest of simplification, marked by straight lines in FIG. 1B, a typical disc surface has curved servo field and data filed boundary lines. The curved boundary lines follow an arc of a head pivoting around an actuator pivot. The embedded servo fields 114 are utilized by a servo sub-system (not shown) to position head 106 over a particular track. During track following, servo information sensed by head 106 is demodulated to generate a position error signal (PES) which provides an indication of the distance between the head and the track center. The PES is then converted into an actuator control signal, which is used to control actuator 108, which positions head 106.

As noted above, read channel circuitry 116 is configured to function in a normal operation mode and a test mode. In the normal operation mode, read channel 116 produces decoded bit estimates from the analog readback signal. In the test mode, read channel 116 extracts at least one of gain control loop data and timing control loop data from the readback signal. Since the above embodiment relates to operating the read channel in a test mode and a normal operation mode, the above teachings also apply to systems which do not carry out write operations and therefore do not include a write head, such as 109, but only include a read head such as 107. Details regarding the collection of gain control loop data and/or timing control loop data in a disc drive are described below in connection with FIGS. 2 and 3.

Figure 2:
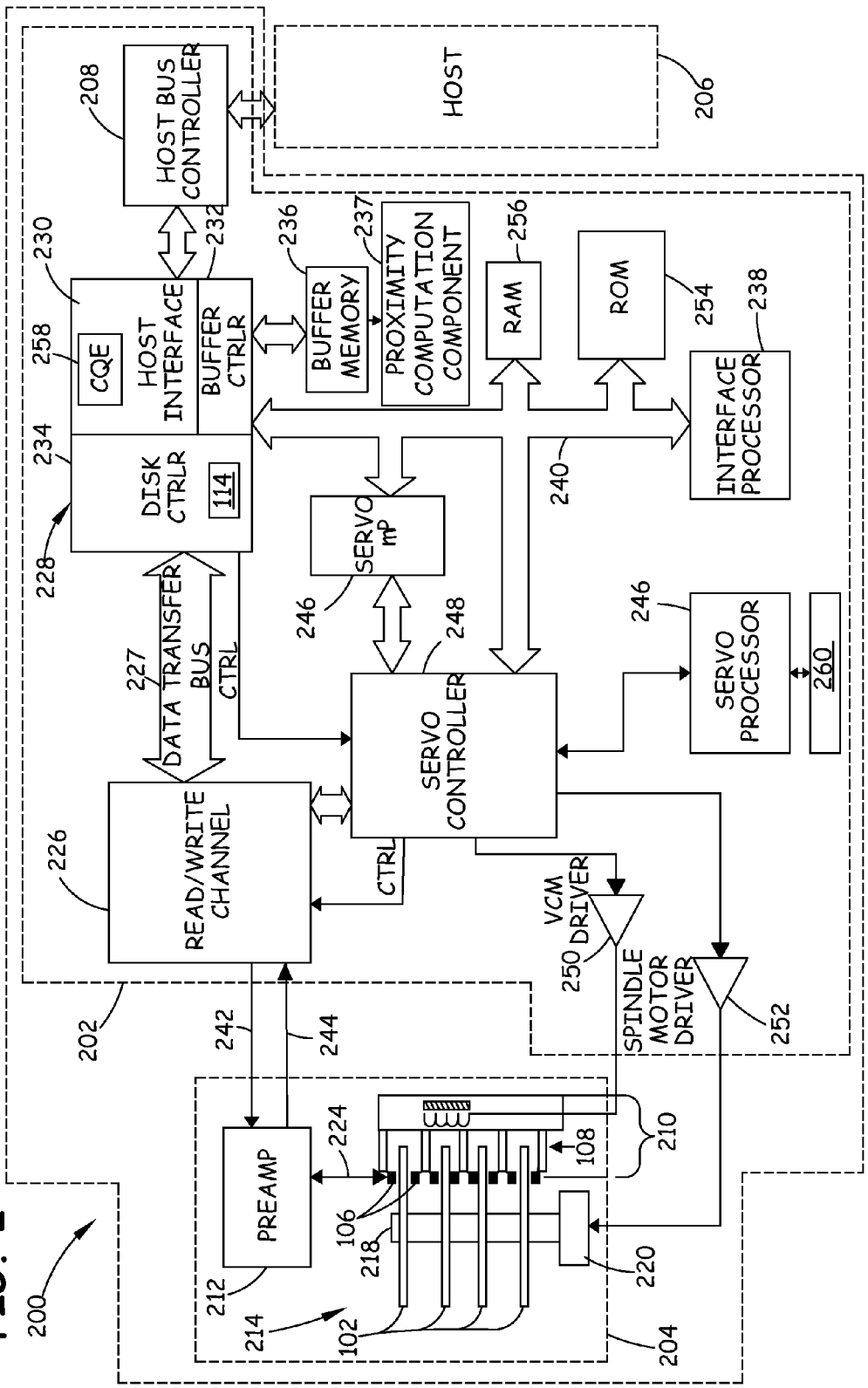
FIG. 2 is a block diagram of a disc drive in accordance with one embodiment.

Referring now to FIG. 2, a simplified block diagram of a disc drive that collects gain control loop data and/or timing control loop data, is shown. The same reference numerals are used in FIG. 2 for elements that are similar to those included in FIG. 1. Disc drive 200 includes a PCBA 202 and a head stack assembly (HSA) 204. PCBA 202 includes circuitry and processors, which provide a target interface controller for communicating between a host system 206 and HSA 204. Host system 206 can include a microprocessor-based data processing system such as a personal computer or other system capable of performing a sequence of logical operations. Data is transmitted between host system 206 and PCBA 202 via a host bus connector 208. HSA 204 includes an actuator assembly 210, a preamplifier 212, and a disc assembly 214. Disc assembly 214 includes a plurality of media discs 102, stacked on a spindle assembly 218. Spindle assembly 218 is mechanically coupled to a spindle motor 220 for rotating the discs at a high rate of speed.

Actuator assembly 210 includes a voice coil motor (VCM), and multiple actuator arms 108. Located at the end of each actuator arm are heads 106, which are associated with a respective disc surface. Heads 106 communicate with disc controller circuit board 202 via a cable assembly 224 connected to preamplifier 212 for reading and writing data to the head's associated disc surface. Preamplifier 212 provides an amplified signal to a read/write channel 226 of PCBA 202. Read/write channel 226 performs encoding and decoding of data written to and read from the disc.

A servo processor 246 provides intelligent control of actuator assembly 110 and spindle motor 220 through a servo controller 248. By commands issued to servo controller 248 by servo processor 246, VCM driver 250 is coupled to move actuator assembly 210 and spindle motor driver 252 is coupled to maintain a constant spin rate of spindle motor 220.

PCBA 202 includes a host interface disc controller (HIDC) application-specific integrated circuit (ASIC) 228. ASIC 228 includes a host interface 230, a buffer controller 232, and a disc controller 234. Host interface 230 communicates with host system 206 via host bus connector 208 by receiving commands and data from and transmitting status and data back to host system 206. A command cueing engine (CQE) 258 is incorporated in host interface 230. Buffer controller 232 controls a buffer memory 236, which can be a non-volatile memory, for example. HDIC 228 and read/write channel 226 communicate via a data transfer bus 227.

Disc controller 234 tracks the timing of data sectors passing under a currently selected head and accordingly sends data to and receives data from read/write channel 226. Disc controller 234 also provides for and error detection error correction on data transmitted to and read from discs 102.

An interface processor 238 manages a cue of commands received from host 206 with the assistance of the CQE 258 embedded in host interface 230. Interface processor 238 interfaces with functional elements of PCBA 202 over a bus 240, for transfer of commands, data, and status.

Disc system operational programs may be stored in read-only memory (ROM) 254, and are loaded into random access memory (RAM) or program loading memory 256 for execution by interface processor 238. Suitably, servo processor 246 may have integrated or separate memory 260 for storage of servo programs.

As indicated earlier, the disc drive read channel within block 226 is configured to operate in a test mode and a normal operation mode. In the normal operation mode, the gain control loop data and/or timing control loop data is routed from the read channel within block 226 through servo controller 248 and is stored in RAM 256. Disc drive 200 is configured, for example, such that this path limits the collection of gain control loop and/or timing control loop data to one data sample per servo wedge. In the test mode, the gain control loop data and/or timing control loop data from the read channel 226 is routed to the buffer memory 236 via the data transfer bus 227, the HDIC 228 and the buffer controller 232. This path, in the test mode, is capable of recording the gain control loop data and/or timing control loop data for each symbol of data during a read operation. However, in the normal operation mode, this path is used to obtain data bits instead of the gain control loop data and/or timing control loop data. Thus, buffer memory 236 serves as a common memory that stores the gain control loop data and/or timing control loop data in the test mode and stores data bits in the normal operation mode. Gain control loop data and/or timing control loop data collected in buffer memory 236 can be used, for example, by a proximity computation component 237, which calculates whether any proximity (contact and near-contact events) occurred between the head(s) 106 and the disc(s) 102.

Figure 3:
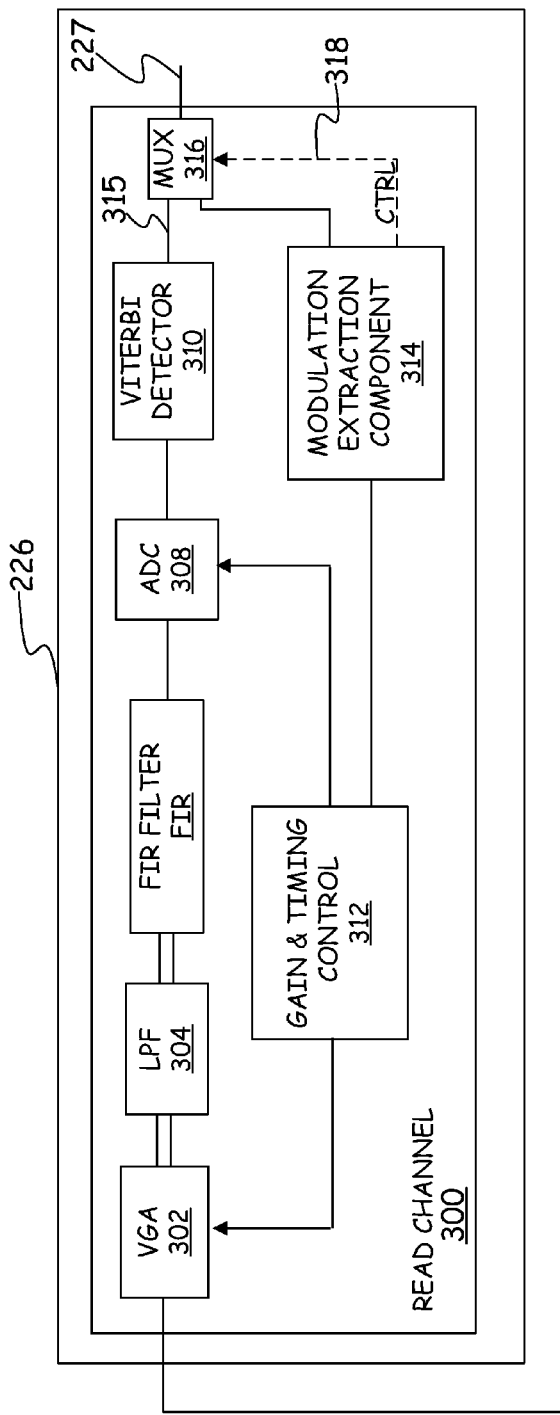
FIG. 3 is a block diagram of an exemplary read channel that can be employed in the disc drive of FIG. 2.
Figure 3:
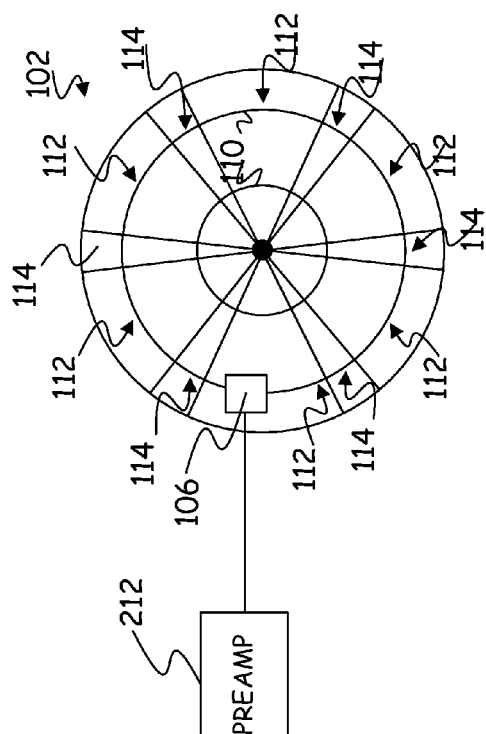

To provide a better understanding of the collection of readback signal modulation data within block 226, read channel components within block 226 in accordance with one embodiment are shown in FIG. 3. The same reference numerals are used in FIG. 3 for elements that are similar to those included in FIGS. 1 and 2. Read channel 300 passes the amplified readback signal from preamplifier 212 through a series of processing blocks that are arranged in cascade to provide a read channel output at 315. The cascaded processing blocks in the read channel 300 include a variable gain amplifier (VGA) 302 that receives the preamplifier output, an adjustable low pass filter (LPF) 304 that receives the variable gain amplifier output, a finite impulse response (FIR) filter 306 that receives the low pass filter output, an analog-to-digital converter (ADC) 308 that receives the FIR filter output, and a Viterbi detector 310 that receives the ADC output and, in turn, provides the read channel output 315.

Read channel 300 also includes a gain and timing control component 312 that reads the ADC output and provides an output that controls timing and other functions of the ADC 308. It should be noted that timing control loop data can include phase control loop data and/or frequency control loop data. The gain and timing control 312 also controls a gain of VGA 302. A modulation extraction component 314 is configured to receive instructions to operate the read channel in a test mode or a normal operation. It should be noted that all the processing blocks (including timing control component 312 and modulation extraction component 314) in the read channel 300 can be modeled as state machines and may be implemented using software, hardware or firmware and may include one or more storage units or memories that store program code, computation results, etc. Also, the processing blocks in the read channel can include one or more processors that execute program code, commands, etc.

If instructed to operate in the test mode, component 314 disables the output of data bits from Viterbi detector 310 (for example, by suitably controlling a multiplexer (MUX) 316 by sending a select-test-mode control signal via control line 318) and instead provides extracted gain control loop data and/or timing control loop data for each symbol of data during a read operation. In the normal operation mode, the output of data bits from Viterbi detector 310 is enabled (for example, by sending a select normal-operation-mode control signal via control line 318 to switch 316) and no gain control loop data and/or timing control loop data for each symbol of user data is provided. As can be seen in FIG. 3, any data (for example, data bits from Viterbi detector 310 or gain control loop data and/or timing control loop data) output by read channel 300 is provided through data transfer bus 227.

Referring back to FIG. 2, as noted above, gain control loop data and/or timing control loop data collected in buffer memory 236 can be used, for example, by proximity computation component 237, which calculates whether any proximity (contact and near-contact events) occurred between the head(s) 106 and the disc(s) 102. In one embodiment, proximity computation component 237 comprises its own internal memory (not shown) that includes instructions to read the gain control loop data and/or timing control loop data collected in buffer memory 236 and to compute the proximity from the gain control loop data and/or timing control loop data read from buffer memory 236. The instructions stored in the internal memory are executed by a processor (not shown) that is, for example, within component 237 or by other components in the disc drive such as disc controller 228. The proximity computation results can be stored in the internal memory of component 237 or in any other suitable memory within, or external to, the disc drive.

It is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular type of data storage system in which the read channel is used without departing from the spirit and scope of the present disclosure.

What is claimed is:

1. A method comprising:
    establishing a test mode and a normal operation mode in a read channel of a data storage device;
    decoding a readback signal to obtain data bits in the normal operation mode;
    collecting gain control loop data from the readback signal, during operation of the read channel in the test mode, at a different sample rate than any gain control loop data collected during the normal operation mode; and
    disabling an output of the data bits from a detector of the read channel during the test mode when the readback signal is being obtained from reading user data.

2. The method of claim 1, wherein collecting the gain control loop data comprises extracting the gain control loop data from the readback signal while reading the user data stored on a data storage medium in the data storage device.

3. The method of claim 2, wherein collecting the gain control loop data further comprises transferring the extracted gain control loop data over a data transfer bus.

4. The method of claim 3, wherein collecting the gain control loop data further comprises receiving the extracted gain control loop data from the data transfer bus and storing the extracted gain control loop data.

5. The method of claim 4, further comprising providing a common memory, which is a same buffer memory that stores the gain control loop data received from the data transfer bus in the test mode and also stores the data bits received from the data transfer bus in the normal operation mode.

6. The method of claim 2, wherein the readback signal is generated by a head that communicates with the data storage medium.

7. The method of claim 6, further comprising reading the gain control loop data from the common memory and computing a proximity between a head and the data storage medium as a function of the gain control loop data read from the common memory, the reading and computing is carried out by a processor that executes stored instructions.

8. The method of claim 1, wherein the gain control loop data comprises modulated data.

9. A data storage system comprising:
    a read channel comprising:
        a normal operation mode in which the read channel is configured to decode a readback signal to obtain data bits;
        a test mode in which the read channel is configured to extract gain control loop data from the readback signal at a different sample rate than any gain control loop data extracted during the normal operation mode; and
        circuitry configured to disable an output of the data bits from a detector of the read channel during the test mode when the readback signal is being obtained from reading user data.

10. The data storage system of claim 9, further comprising a memory configured to receive, via a data transfer bus, the gain control loop data, and configured to store the gain control loop data.

11. The data storage system of claim 10, wherein the read channel is within a disc drive, and wherein the memory is a same buffer memory, in the disc drive, that is configured to store the gain control loop data and that is configured to receive, via the data transfer bus, data bits in the normal operation mode, and configured to store the data bits in the normal operation mode.

12. The data storage system of claim 10, wherein the memory is a non-volatile buffer memory.

13. The data storage system of claim 9, further comprising a head that communicates with a data storage medium and generates the readback signal.

14. The data storage system of claim 13, further comprising a proximity computation component that computes a proximity between the head and the data storage medium as a function of the gain control loop data.

15. The data storage system of claim 9, wherein the detector comprises a Viterbi detector, and wherein the read channel further comprises:
    an amplifier to receive a preamplifier output;
    a filter to receive an amplifier output;
    an analog-to-digital converter (ADC) to receive a filter output;
    the Viterbi detector to receive an ADC output; and a modulation extraction component to receive instruction to operate the read channel in the test mode or the normal operation mode.

16. A method comprising:

extracting at least one of gain control loop data or timing control loop data from a readback signal obtained from reading user data stored on a data storage medium instead of obtaining data bits from the readback signal, wherein:

the data storage medium is a part of a data storage system having a read channel that operates in either a test mode or a normal operation mode, and the extracting at least one of gain control loop data or timing control loop data is carried out while the read channel is operating in the test mode with an output of the data bits from a detector of the read channel being disabled during the test mode when the readback signal is being obtained from reading user data, and the at least one of gain control loop data or timing control loop data is extracted at a different sample rate than any gain control loop data or timing control loop data is extracted during the normal operation mode;

transferring, via a data transfer bus, the extracted at least one of gain control loop data or timing control loop data from the readback signal obtained while reading user data stored on a data storage medium; and storing the transferred at least one of gain control loop data or timing control loop data obtained via the data transfer bus.

17. The method of claim 16, further comprising providing a common memory, which is a same buffer memory that stores the at least one of gain control loop data or timing control loop data, received from the data transfer bus, in the test mode, and also stores the data bits, received from the data transfer bus, in the normal operation mode.

18. The method of claim 16, wherein the readback signal is generated by a head that communicates with the data storage medium.

19. The method of claim 18, further comprising reading the at least one of gain control loop data or timing control loop data from the common memory and computing a proximity between the head and the data storage medium as a function of the at least one of gain control loop data or timing control loop data read from the common memory, wherein the reading and computing are carried out by a processor that executes stored instructions.

* * * * *